United States Patent [19]

Lee

[11] Patent Number: 5,727,056
[45] Date of Patent: Mar. 10, 1998

[54] PARALLEL-CONNECTED TELEPHONE USE DETERMINING CIRCUIT IN A CORDLESS TELEPHONE SYSTEM AND METHOD THEREOF

[75] Inventor: Byeong-Kuk Lee, Gumi, Rep. of Korea

[73] Assignee: SamSung Electronics Co., Ltd., Kyungki-do, Rep. of Korea

[21] Appl. No.: 675,877

[22] Filed: Jul. 5, 1996

[30] Foreign Application Priority Data

Jul. 4, 1995 [KR] Rep. of Korea ................. 19486/1995

[51] Int. Cl.⁶ .................................................. H04M 3/58
[52] U.S. Cl. ........................ 379/399; 379/164; 379/377; 379/396
[58] Field of Search ..................... 379/399, 164, 379/156, 161, 162, 163, 165, 166, 377, 382, 396

[56] References Cited

U.S. PATENT DOCUMENTS

| | | | |
|---|---|---|---|
| 4,446,338 | 5/1984 | Rosch | 379/377 |
| 4,677,662 | 6/1987 | Lott | 379/162 |
| 4,680,783 | 7/1987 | Boeckmann | 379/6 |
| 4,734,933 | 3/1988 | Barsellotti et al. | 379/377 |
| 5,140,631 | 8/1992 | Stahl | 379/377 |
| 5,251,256 | 10/1993 | Crowe et al. | 379/377 |
| 5,287,404 | 2/1994 | Pepper et al. | 379/377 |
| 5,388,153 | 2/1995 | Burger et al. | 379/164 |
| 5,394,465 | 2/1995 | Jo | 379/377 |
| 5,422,939 | 6/1995 | Kramer et al. | 379/107 |
| 5,422,947 | 6/1995 | Azem | 379/396 |
| 5,446,786 | 8/1995 | Shtulman | 379/377 |
| 5,521,974 | 5/1996 | Hayashi et al. | 379/377 |
| 5,533,117 | 7/1996 | Kim | 379/396 |

Primary Examiner—Jack Chiang
Assistant Examiner—Jacques M. Saint-Surin
Attorney, Agent, or Firm—Robert E. Bushnell, Esq.

[57] ABSTRACT

A parallel-connected telephone use determining circuit using a microcomputer having therein an analog-to digital converter for determining an operation status of a parallel-connected telephone system connected to a telephone line. The circuit includes a rectifier for rectifying the variance of voltage applied through a telephone line, a voltage detector for detecting the variance of the voltage rectified from the rectifier, and a central processing unit (CPU) having an A/D converter incorporated therein for converting the voltage variance output from the voltage detector into a digital signal, for detecting the digital signal converted from the A/D converter and determining whether a parallel-connected telephone is in use.

20 Claims, 3 Drawing Sheets

PARALLEL-CONNECTED TELEPHONE USE DETERMINING CIRCUIT IN A CORDLESS TELEPHONE SYSTEM AND METHOD THEREOF

CROSS-REFERENCE TO RELATED APPLICATION

This application makes reference to, incorporates the same herein, and claims all benefits accruing under 35 U.S.C. §119 from an application for Parallel-Connected Telephone Use Determining Circuit In A Cordless Telephone System And Method Thereof earlier filed in the Korean Industrial Property Office on 4 Jul. 1995, and there duly assigned Ser. No. 19486/1995.

BACKGROUND OF THE INVENTION

1. Technical Field

The present invention relates to a parallel-connected telephone use determining circuit for determining an operation status of a standard telephone line in a parallel-connected telephone system, and more particularly relates to a parallel-connected telephone use detection circuit using a microcomputer having an analog-to-digital (A/D) converter incorporated therein for determining an operation status of a standard telephone line with two or more telephone systems connected in parallel thereto.

2. Background Art

In general, when several telephone sets including automated devices such as answering machines, facsimile machines and the like, are each connected in parallel to the same subscriber telephone line, it is useful to know when one telephone set is being used so as to avoid picking up and interrupting a telephone call by picking up another telephone set, or alternatively to enable two or more people to simultaneously participate in a telephone conversation via the subscriber telephone line. In this way, a device for detecting such use of a subscriber telephone line may be used when it is desirable to inform a subscriber if a common telephone line is being used by any of the telephone sets connected to the same telephone line.

There are several known telephone use detection circuits available in the art such as disclosed in U.S. Pat. No. 4,677,662 for Multiple Line Self-Contained Telephone issued to Lott, U.S. Pat. No. 5,140,631 for Apparatus And Method For Determining The State Of A Telephone Line issued to Stahl, U.S. Pat. No. 5,287,404 for Telephone Subscriber Line Voltage Change Detection issued to Pepper et al., U.S. Pat. No. 5,394,465 for Parallel Phone Detection Circuit issued to Jo, and U.S. Pat. No. 5,422,947 for Telephone In-Use Indicator issued to Azem, for determining whether a common telephone line is in use. Typically, such conventional circuits detect when a common telephone line goes "off-hook" i.e., when one telephone set is lifted up in preparation of placing a call. When a telephone line goes "off-hook" a low impedance is placed across the telephone line. This low impedance reduces the line voltage in an "on-hook" condition to a lower "off-hook" line voltage and results in a significant increase in the line current. Changes in line voltage or line current are then used to determine whether a telephone line is in use. Such conventional circuits, however, tend to be rather complex and consequently costly for mass production. Moreover, since the conventional circuits rely on voltage changes across the telephone line, they are more susceptible to be fooled by inadvertent noise as well as the operation of a telephone dialer.

Recent improvements of conventional telephone use detection circuits are disclosed, for example, in U.S. Pat. No. 5,388,153 for Apparatus And Method For Determining Telephone Line Status issued to Burger et al., and U.S. Pat. No. 5,446,786 for Two-Wire Telecommunications Line Detection Arrangements issued to Shtulman. In Burger et al. '153, an improved telephone use detection circuit is designed to enhance protection against inadvertent noise as well as the operation of a telephone dialer. Filter which undesirably adds to the production, is necessarily used to suppress induced alternating currents on a telephone line however. In Shtulman '786, another improved telephone use detection arrangement is disclosed that is insensitive to common mode alternating currents induced on the telephone line. The telephone use detection circuit includes two comparators each for comparing a voltage on a respective wire of a common telephone line with a respective reference voltage. A logic circuit or software responsive to outputs of comparators is then used to determine the "off-hook" and "on-hook" state of a telephone set in use. These telephone use detection circuits, however, remain complex.

SUMMARY OF THE INVENTION

Accordingly, it is therefore an object of the present invention to provide a simplified and low cost parallel-connected telephone use determining circuit.

It is another object to provide a simplified parallel-connected telephone use determining circuit for determining an operation status of a telephone line reliably regardless of noise and adverse influence by common mode alternating currents induced on the telephone line.

These and other objects of the present invention can be achieved by a parallel-connected telephone use determining circuit using a microcomputer having an analog-to-digital (A/D) converter incorporated therein for determining an operation status of a standard telephone line with two or more telephone systems connected in parallel thereto. The parallel-connected telephone use determining circuit includes a rectifier for rectifying the variance of voltage applied through a telephone line; a voltage detector for detecting the variance of the voltage rectified from the rectifier; an A/D convertor for converting the voltage variance output from the voltage detector into a digital signal; and a central processing unit (CPU) for detecting the digital signal converted from the A/D converter and determining whether a parallel-connected telephone system is being used.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
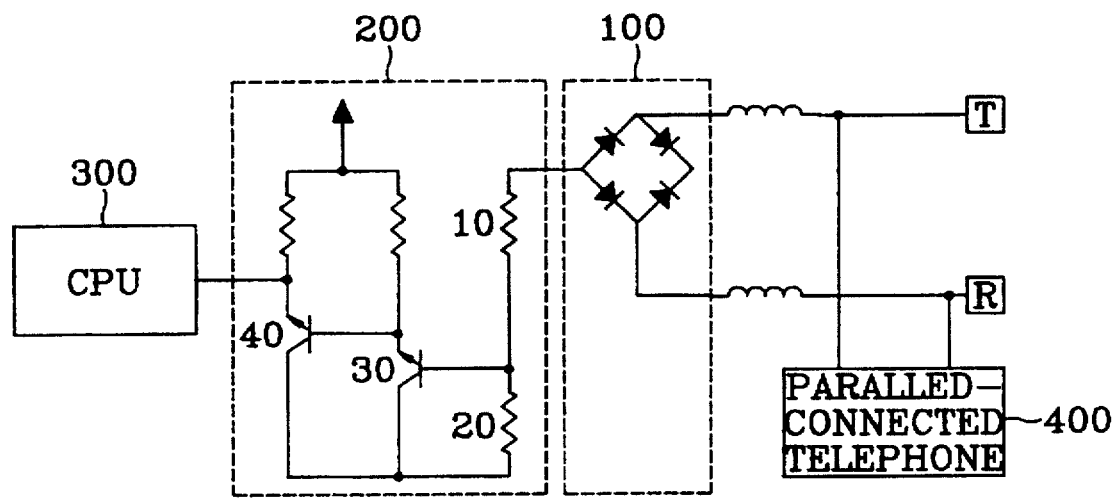
FIG. 1 is an abstract representation of a typical parallel-connected telephone use determining circuit.

Referring now to the drawings and particularly to FIG. 1, which illustrates a typical parallel-connected telephone use determining circuit for use in a cordless telephone system. As shown in FIG. 1, the typical parallel-connected telephone use determining circuit includes a bridge rectifier 100 connected to a telephone line, a voltage detector 200 connected to the bridge rectifier 100, a central processing unit (CPU) 300 connected to the voltage detector 200 and a parallel-connected telephone 400. The voltage supplied from a telephone line is rectified by a bridge rectifier 100 and is applied to a base of a transistor 30 in a "high" state by distribution of resistances 10 and 20 to turn the transistor 30 on. At this time, the collector output port of the transistor 30 becomes "low" to turn a transistor 40 off. Thus, a constant level of a "high" signal is applied from the collector output port of the transistor 40 to the CPU 300 to determine that a parallel-connected telephone 400 is not being used. However, if the parallel-connected telephone 400 is being used, a "low" signal is applied to a base port of the transistor 30 to turn the transistor off. At this time, the collector output port of the transistor 30 becomes "high" to turn the transistor on. Thus, a constant level of a "low" signal is applied from the collector output port of the transistor 40 to the CPU 300 to determine that a parallel-connected telephone 400 is being used.

As described above, since the voltage detector 200 of the conventional parallel-connected telephone use determining circuit generates a logic "low" or "high" signal using required resistance or transistors, the circuitry becomes complex and malfunction often occurs which lowers the reliability of the circuit.

Figure 2:
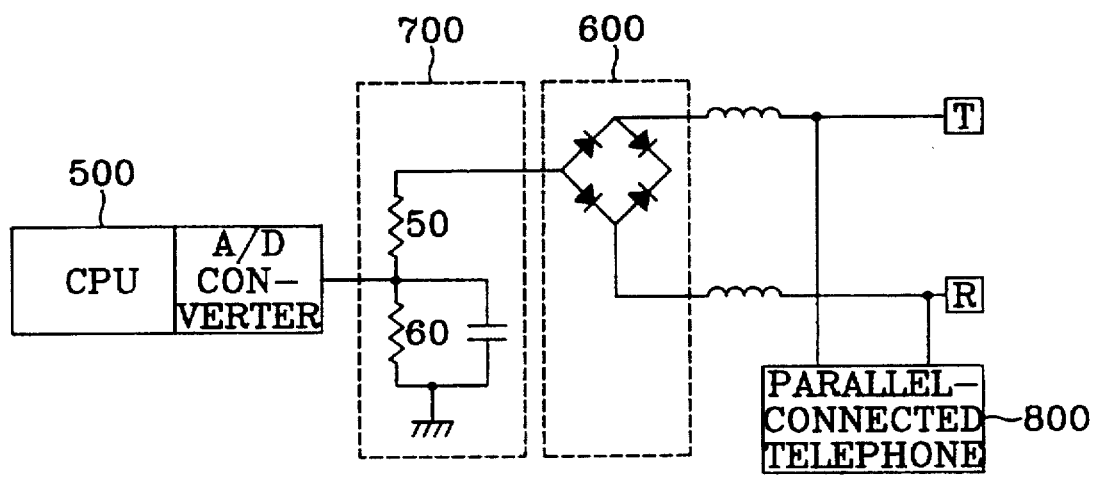
FIG. 2 is a block diagram illustrating a construction of a parallel-connected telephone use determining circuit using a microcomputer having an analog-to-digital (A/D) converter incorporated according to the principles of the present invention.

Turning now to FIG. 2 which illustrates a parallel-connected telephone use determining circuit using a microcomputer having an analog-to-digital (A/D) converter incorporated according to the principles of the present invention. The parallel-connected telephone use determining circuit constructed according to the present invention includes a rectifier 600 for rectifying the variance of voltage applied through a telephone line. The rectifier 600 may be constructed by a diode bridge having an input connected to tip T and ring R terminals of a telephone line. A voltage detector 700 is connected to an output terminal of the rectifier 600 for detecting the variance of the voltage rectified from the rectifier 600. The voltage detector 700 includes resistors 50 and 60 connected between the output terminal of the rectifier 600 and a ground terminal, with a capacitor connected in parallel with the resistor 60 between a common junction and the ground terminal. A central processing unit (CPU) 500 having an A/D converter is then connected to the common junction of the voltage detector 700 for converting the voltage variance output from the voltage detector 700 into a digital signal, and for detecting the digital signal converted from the A/D converter to determine whether a parallel-connected telephone 800 is in use.

Figure 3:
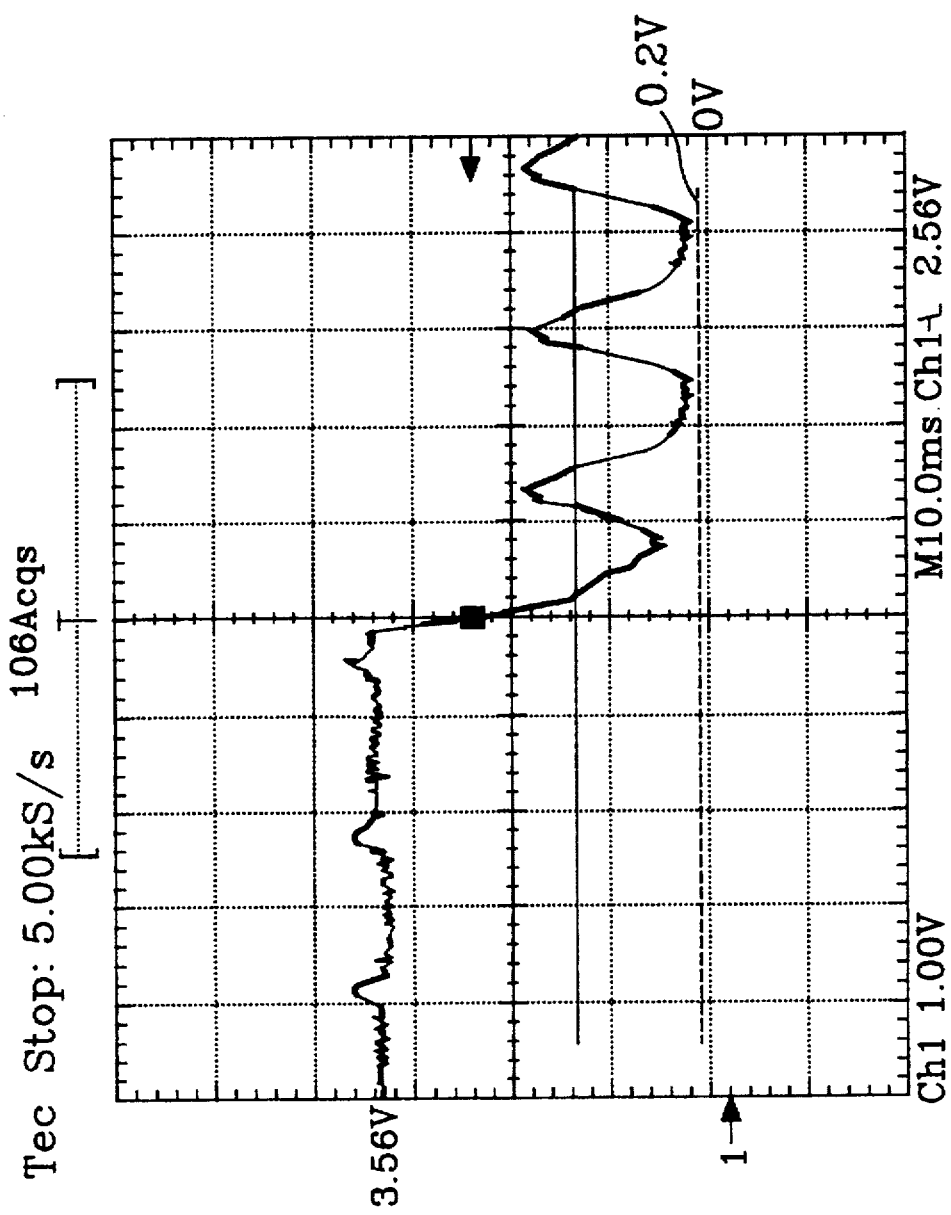
FIG. 3 is a waveform diagram illustrating the voltage variance of a telephone line when a parallel-connected telephone system is either in use or not in use according to the principles of the present invention.

FIG. 3 illustrates the voltage variance of a telephone line when a parallel-connected telephone system is either in use or not in use according to the principles of the present invention. Generally, when the parallel-connected telephone 400 is in not use i.e., remains "on-hook", the voltage across the tip T and ring R terminals of the telephone line is maintained, for instance, at approximately 3.56V. However, when the parallel-connected telephone 400 is in use i.e., "off-hook", the voltage across the tip T and ring R terminals of the telephone line drops as low as 0.2V and fluctuates around 1.2V.

Figure 4:
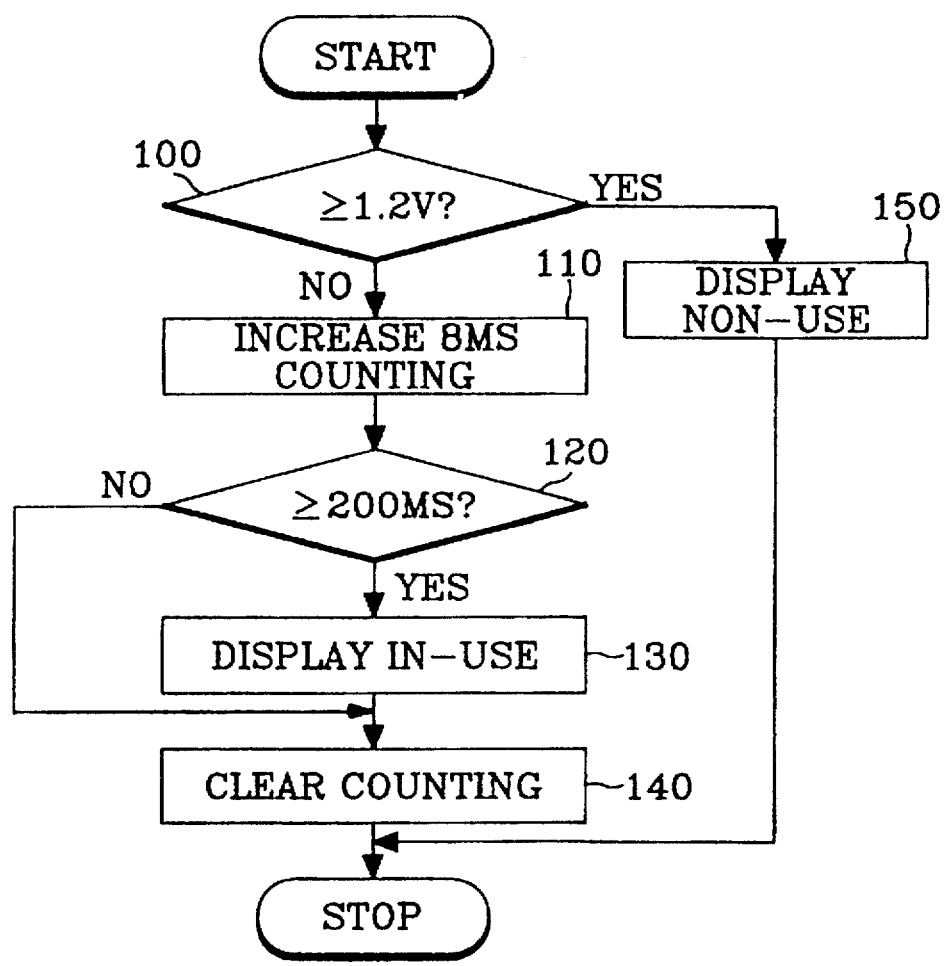
FIG. 4 is a flowchart for determining whether a parallel-connected telephone system is in use according to the principles of the present invention.

FIG. 4 is a flowchart for determining whether the parallel-connected telephone according to the present invention is in use. As contemplated by the present invention, if the detected voltage is less than 1.2V, 8 millisecond counting is increased. If, on the other hand, the detected voltage is not less than 1.2V, a visual display of non-use is provided to indicate that the parallel-connected telephone 400 is not in use. However, if the detected voltage less than 1.2V is maintained for 200 milliseconds or more, a visual display of in-use is provided to indicate that the parallel-connected telephone 400 is being used. When the in-use indication is displayed, the 8 millisecond counting is cleared.

The method of determining whether the parallel-connected telephone 800 is in use according to the principles of the present invention will be described in detail with reference to FIGS. 2 through 4 as follows.

The voltage supplied from a telephone line is rectified by a bridge rectifier 600 and is applied to the A/D converter by distribution of resistors 50 and 60. At this time, referring to FIG. 3 showing the waveform of the applied analog signal, if the parallel-connected telephone 800 is not in use, the waveform of the signal applied to the A/D converter as shown to the left of a central reference line is maintained at 3.56V. If the parallel-connected telephone 800 is in use, however, the waveform of the signal applied to the A/D converter as shown to the right of the central reference line is maintained at 1.2V. This represents a type of radio rectification having a riffle voltage in which the voltage is displayed down. The variance of the detected voltage is then converted into the digital signal by the A/D converter incorporated in the CPU 500. At this time, the CPU 500 determines whether the applied voltage is greater than or equal to 1.2V at step 100 as shown in FIG. 4. If the applied voltage is not less than 1.2V at step 100, the CPU 500 provides a visual display of non-use to indicate that the parallel-connected telephone 400 is not in use at step 150. If the applied voltage is less than 1.2V at step 100, the CPU 500 increases a 8 millisecond counting at step 110. Thereafter, at step 120, the CPU 500 determines whether the applied voltage of less than 1.2V is maintained for 200 milliseconds or more or not. If the applied voltage of less than 1.2V is not maintained for 200 milliseconds, the CPU 500 clears the counting step 140 and terminates the program. If the applied voltage of less than 1.2V is maintained for 200 milliseconds or more, however, the CPU 500 provides a visual display of in-use to indicate that the parallel-connected telephone is in use at step 130. Then, the CPU 500 clears the counting at step 140 to terminate the program.

As described above, the parallel-connected telephone use determining circuit as constructed according to the present invention advantageously provides a reliable means to inform a subscriber whether a telephone set connected in parallel to a telephone line is in use by way of a microcomputer having therein an A/D converter. The use of a microcomputer and an A/D converter simplifies the circuitry, prevents malfunction that often occurs in the art and remains fool-proof against inadvertent noise as well as the operation of a telephone dialer.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A parallel-connected telephone use determining circuit, comprising: rectifying means connected to tip and ring wires of a telephone line, for rectifying a line voltage between the tip and ring wires of the telephone line;

voltage detecting means connected to said rectifying means, for detecting the variance of the line voltage rectified from said rectifying means;

converting means for converting the voltage variance output from said voltage detecting means into a digital signal; and processing means for determining whether a telephone set connected in parallel to the telephone line is in use in response to said digital signal, said processing means determining whether the telephone set is in use by a program comprising the steps:

determining whether said digital signal represents the line voltage of a predetermined value;

when said digital signal represents the line voltage of not less than said predetermined value, providing a visual display of "non-use" indicating that the telephone set connected in parallel to the telephone line is not in use;

when said digital signal represents the line voltage of less than said predetermined value, determining whether said digital signal represents the line voltage maintained at less than said predetermined value for a predetermined time period;

when said digital signal represents the line voltage that fails to maintain at less than said predetermined value for said predetermined time period, terminating the program; and when said digital signal represents the line voltage that maintains at less than said predetermined value for said predetermined time period, providing a visual display of "in-use" indicating that the telephone set connected in parallel to the telephone line is in use, and terminating the program.

2. The parallel-connected telephone use determining circuit of claim 1, further comprised of said rectifying means corresponding a diode bridge.

3. The parallel-connected telephone use determining circuit of claim 1, further comprised of said voltage detecting means comprising first and second resistors connected in series between an output terminal of said rectifying means and a ground terminal, with a capacitor connected in parallel with the second resistor between a common junction between the first and second resistors and the ground terminal.

4. The parallel-connected telephone use determining circuit of claim 3, further comprised of said predetermined value corresponding 1.2Volts.

5. The parallel-connected telephone use determining circuit of claim 4, further comprised of said predetermined time period corresponding 200 milliseconds.

6. The parallel-connected telephone use determining circuit of claim 1, further comprised of said predetermined value corresponding 1.2Volts.

7. The parallel-connected telephone use determining circuit of claim 1, further comprised of said predetermined time period corresponding 200 milliseconds.

8. A parallel-connected telephone use determining method in a telephone set connected in parallel to a telephone line, comprising the steps of:

determining whether a line voltage across tip and ring terminals of the telephone line is less than 1.2Volts;

when the line voltage is not less than 1.2Volts, determining that the telephone set connected in parallel to the telephone line is not in use;

when the line voltage is less than said 1.2Volts, increasing a 8 millisecond counting;

determining whether the line voltage of less than 1.2Volts is maintained at least for 200 milliseconds;

when the line voltage of less than 1.2Volts is maintained at least for 200 milliseconds, determining that the telephone set connected in parallel to the telephone line is in use, and clearing said 8 millisecond counting for termination; and when the line voltage of less than 1.2Volts is not maintained at least for 200 milliseconds, clearing said 8 milliseconds counting for termination.

9. A parallel-connected telephone use determining circuit, comprising:

rectifying means connected to tip and ring wires of a telephone line, for rectifying a line voltage between the tip and ring wires of the telephone line;

voltage detecting means connected to said rectifying means, for detecting the variance of the line voltage rectified from said rectifying means;

converting means for converting the voltage variance output from said voltage detecting means into a digital signal; and processing means for determining whether a telephone set connected in parallel to the telephone line is in use in response to said digital signal, said processing means determining whether the telephone set is in use by a program comprising the steps:

determining whether said digital signal represents the line voltage of less than 1.2Volts;

when said digital signal represents the line voltage of not less than 1.2Volts, providing a visual display of "non-use" indicating that the telephone set connected in parallel to the telephone line is not in use;

when said digital signal represents the line voltage of less than 1.2Volts, determining whether said digital signal represents the line voltage of less than 1.2Volts is maintained for 200 milliseconds;

when said digital signal represents the line voltage of less than 1.2Volts is not maintained for 200 milliseconds, terminating the program; and when said digital signal represents the line voltage of less than 1.2Volts is maintained for 200 milliseconds, providing a visual display of "in-use" indicating that the telephone set connected in parallel to the telephone line is in use, and terminating the program.

10. The parallel-connected telephone use determining circuit of claim 9, further comprised of said rectifying means corresponding a diode bridge.

11. The parallel-connected telephone use determining circuit of claim 10, further comprised of said voltage detecting means comprising first and second resistors connected in series between an output terminal of said rectifying means and a ground terminal, with a capacitor connected in parallel with the second resistor between a common junction between the first and second resistors and the ground terminal.

12. The parallel-connected telephone use determining circuit of claim 9, further comprised of said voltage detecting means comprising first and second resistors connected in series between an output terminal of said rectifying means and a ground terminal, with a capacitor connected in parallel with the second resistor between a common junction between the first and second resistors and the ground terminal.

13. A parallel-connected telephone use determining circuit, comprising: a voltage detector for detecting a line voltage across tip and ring terminals of a telephone line; a converter for converting the line voltage output from said voltage detector into a digital signal; and a micro-processor connected to the converter, for determining whether a telephone set connected in parallel to the telephone line is in use in response to said digital signal, said micro-processor determining whether the telephone set is in use by:
  determining whether said digital signal represents the line voltage across the tip and ring terminals of the telephone line of a predetermined value;
  when said digital signal represents the line voltage of not less than said predetermined value, providing a visual display of "non-use" indicating that the telephone set connected in parallel to the telephone line is not in use;
  when said digital signal represents the line voltage of less than said predetermined value, determining whether said digital signal represents the line voltage maintained at less than said predetermined value for at least a predetermined time period; and
  when said digital signal represents the line voltage that maintains at less than said predetermined value for at least said predetermined time period, providing a visual display of "in-use" indicating that the telephone set connected in parallel to the telephone line is in use.

14. The parallel-connected telephone use determining circuit of claim 13, further comprised of said micro-processor terminating determining whether the telephone set is in use, when said digital signal represents the line voltage that fails to maintain at less than said predetermined value for at least said predetermined time period.

15. The parallel-connected telephone use determining circuit of claim 13, further comprising a diode bridge connected to the tip and ring terminals of the telephone line for rectifying the line voltage across the tip and ring terminals of the telephone line prior to the conversion of the line voltage into said digital signal.

16. The parallel-connected telephone use determining circuit of claim 15, further comprised of said voltage detector comprising first and second resistors connected in series between an output terminal of said diode rectifier and a ground terminal, with a capacitor connected in parallel with the second resistor between a common junction between the first and second resistors and the ground terminal.

17. The parallel-connected telephone use determining circuit of claim 16, further comprised of said predetermined value corresponding 1.2Volts.

18. The parallel-connected telephone use determining circuit of claim 17, further comprised of said predetermined time period corresponding 200 milliseconds.

19. The parallel-connected telephone use determining circuit of claim 13, further comprised of said predetermined value corresponding 1.2Volts.

20. The parallel-connected telephone use determining circuit of claim 13, further comprised of said predetermined time period corresponding 200 milliseconds.

* * * * *